(No Model.)  2 Sheets—Sheet 1.

J. W. ROBBINS.
CIRCULAR SAWING MACHINE.

No. 305,760. Patented Sept. 30, 1884.

Witnesses.

Inventor
James Webster Robbins
by R. H. Eddy atty.

(No Model.) 2 Sheets—Sheet 2.

J. W. ROBBINS.
CIRCULAR SAWING MACHINE.

No. 305,760. Patented Sept. 30, 1884.

Witnesses.
J. N. Piper
E. B. Pratt

Inventor.
James Webster Robbins.
by R. H. Eddy, att'y.

UNITED STATES PATENT OFFICE.

JAMES WEBSTER ROBBINS, OF ST. JOHNSBURY, VERMONT.

CIRCULAR SAWING MACHINE.

SPECIFICATION forming part of Letters Patent No. 305,760, dated September 30, 1884.

Application filed May 5, 1884. (No model.)

*To all whom it may concern:*

Be it known that I, JAMES WEBSTER ROBBINS, of St. Johnsbury, in the county of Caledonia, of the State of Vermont, have invented a new and useful Improvement in Machinery for Sawing; and I do hereby declare the same to be described in the following specification, and represented in the accompanying drawings, of which—

Figure 1:
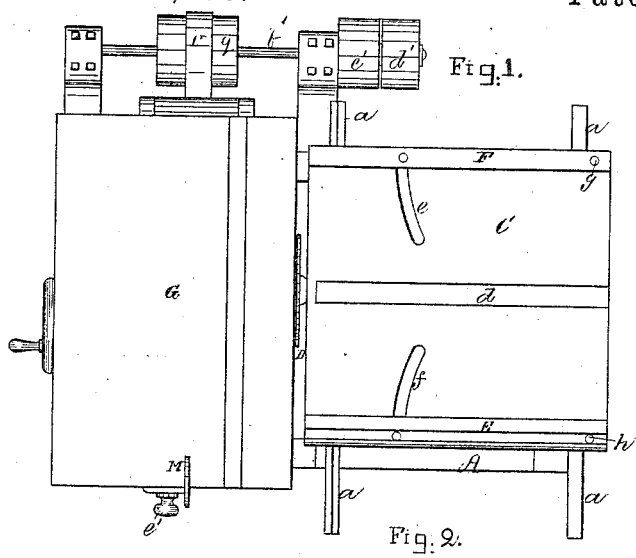
Figure 2:
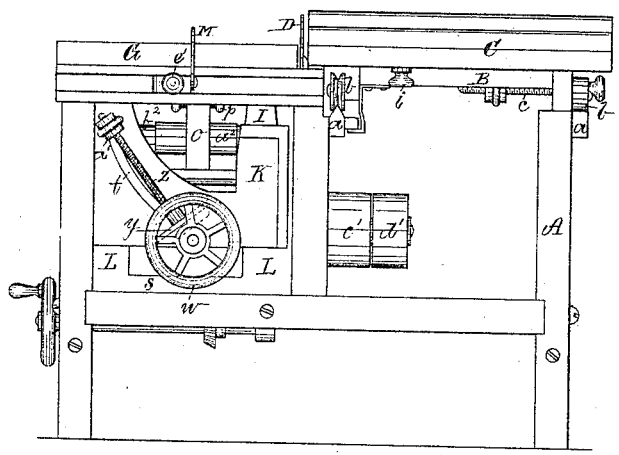
Figure 3:
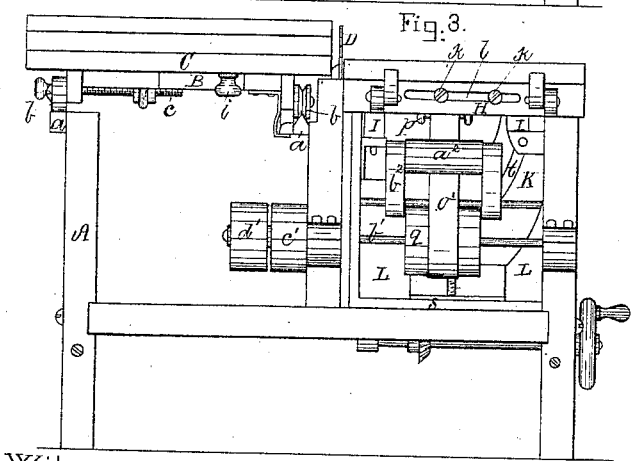
Figures 4, 5:
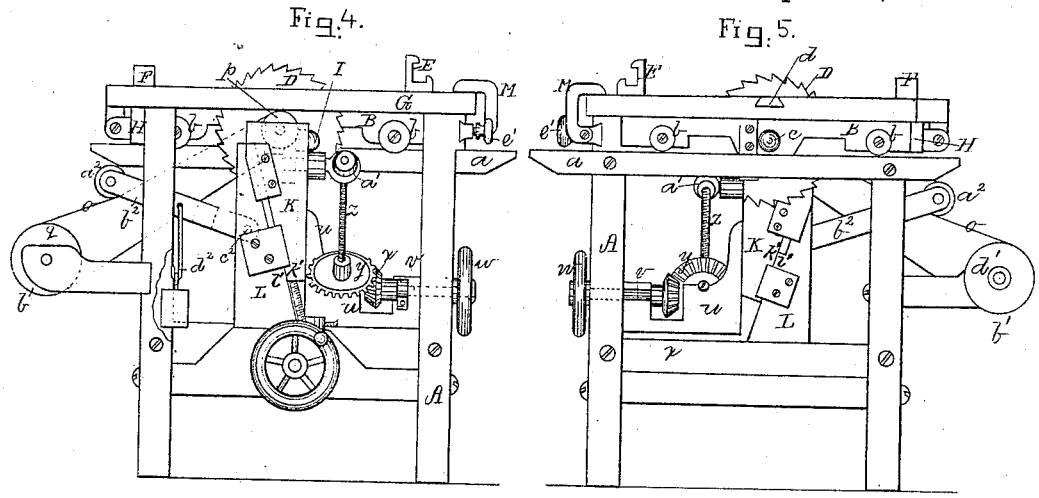
Figure 6:
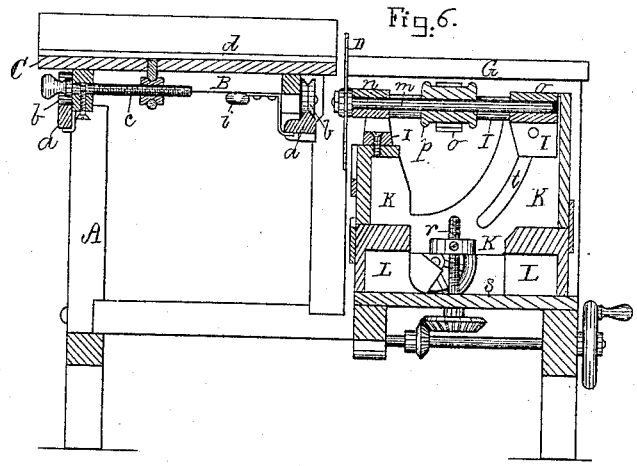

Figure 1 is a top view, Figs. 2 and 3 opposite side elevations, Figs. 4 and 5 opposite end views, and Fig. 6 a longitudinal and vertical section, of a machine embodying my invention, the nature of which is defined in the claim hereinafter presented.

In the drawings, A denotes the frame for supporting the main operative parts to be described. In the upper part of such frame are two parallel and horizontal rails, $a\ a$, over and upon which is a carriage, B, provided with wheels $b$, to rest and run on such rails. Supported on the said carriage is a platform, C, movable toward and from the circular saw D by means of an adjusting-screw, $c$, suitably adapted to the carriage and platform. Along the middle of such platform, and opening out of the rear end of it, is a dovetailed groove, $d$, besides which there are in the platform two curved slots, $e$ and $f$, whose centers of curvature are the pivots $g\ h$ of the straight and movable gages E and F, such gages being placed on the platform at its opposite edges, and provided with clamp-screws $i$, that go through the slots and screw into the said gages. The saw D extends upward between the platform C and an auxiliary platform or table, G, which at one end is hinged to a slotted slide, H, arranged as represented, and held to the frame A by clamp-screws $k$ going through the slot $l$ of such slide and screwed into the said frame. The table G can be turned upward and backward from over the said arbor, as occasion may require, for access thereto or to the parts adjacent to it. Furthermore, by its connection with the frame the table can be moved toward and away from the saw, in order to admit of such saw being inclined more or less to the plane of such table and to that of the platform C. The saw-arbor shown at $m$ is supported in boxes $n\ o$, sustained by a frame, I, that near the saw is pivoted to another frame, K, applied to stationary posts or standards L L, the frame and standards having meeting inclined faces $k'$ and $l'$, whereby the frame is arranged so as to be movable upward or downward on the standards, in a plane inclined to the horizon, to a degree that will prevent the driving-belt $o'$ of the saw-arbor from becoming slackened on its pulleys $p$ and $q$ while the frame K is being raised or lowered by means of a screw, $r$, suitably adapted to it, and a bar, $s$, connecting the two standards L L at their feet. A heavy roller, $a^2$, supported by a frame, $b^2$, pivoted on a rod, $c^2$, extending from one to the other of the posts or standards L L, rests on the driving-belt $o'$. To such frame $b^2$ a weight may be attached by a hook, $d^2$, extending down from the said frame. The weight and roller serve to keep the belt tight under ordinary atmospheric or thermal changes or in case of its becoming stretched in use.

In the frame K there is a slot, $t$, whose radius of curvature has its center in the axis of the pivots of the saw-frame I. A bracket, $u$, projecting from the frame K, supports a shaft, $v$, provided at its outer end with a hand-wheel, $w$, and at its inner end with a beveled pinion, $x$, such pinion being to engage with a bevel-gear, $y$, fixed on a screw, $z$, that, pivoted in the bracket, extends upward and screws into a nut, $a'$, connected with or pivoted to the frame I. By revolving the hand-wheel the saw-frame I may be tipped to cause the saw to stand, and when in operation to cut in a plane more or less inclined to the horizon, as occasion may require.

The driving-pulley $q$ of the endless belt $o$ is fixed on the shaft $b'$, arranged as shown, and provided with a fast pulley, $c'$, and a loose pulley, $d'$, for the reception of a driving-belt from any suitable motor.

At the front end of the table G there is an adjustable dog, M, which is adapted to the frame so as to be movable relatively to the said end of the table, lengthwise thereof, such dog being provided with a clamp-screw, $e'$, for holding it in position.

With the machine above described a piece of board applied to the platform C and extended therefrom upon the auxiliary platform may be sawed.

I am aware that a saw has been arranged with its arbor at an angle to the horizon, and that such saw has been arranged so as to be tilted and raised and lowered. My saw has its arbor horizontal, and when adjusted vertically the whole saw and its arbor move up and down. The saw also can be tilted. By this construction the saw can be used to cut horizontally, as usual, made to vary in vertical position, and be tilted.

In such machine I claim—

In a sawing-machine provided with a saw arranged for adjustment, as described, the combination, with such a saw, of the platform C, adjustable to or from the saw, and in the same plane therewith, and the auxiliary platform G, adjustable similarly, and also adapted to be swung upward, as and for the purpose set forth.

JAMES WEBSTER ROBBINS.

Witnesses:
CALVIN MORRILL,
S. L. MORRILL.